Figure 1:
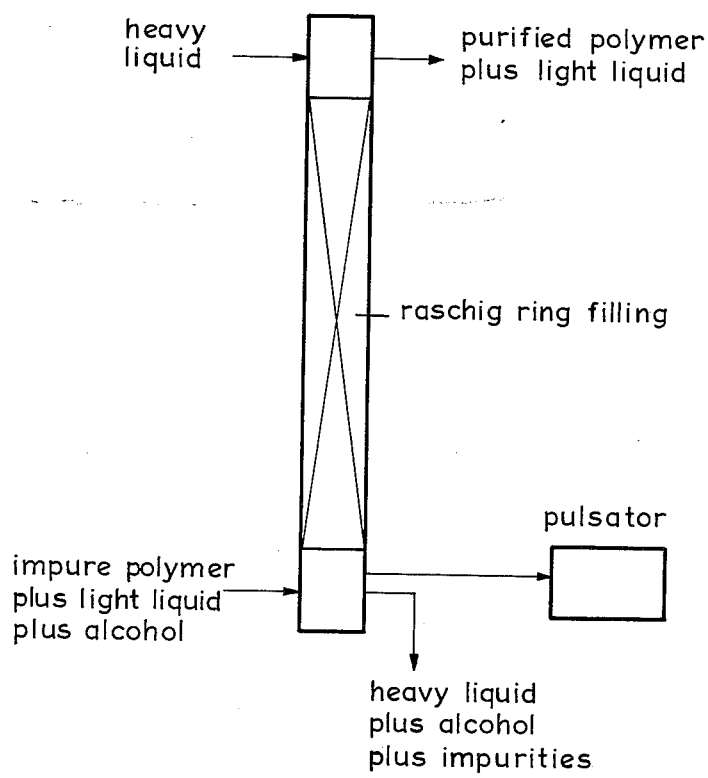

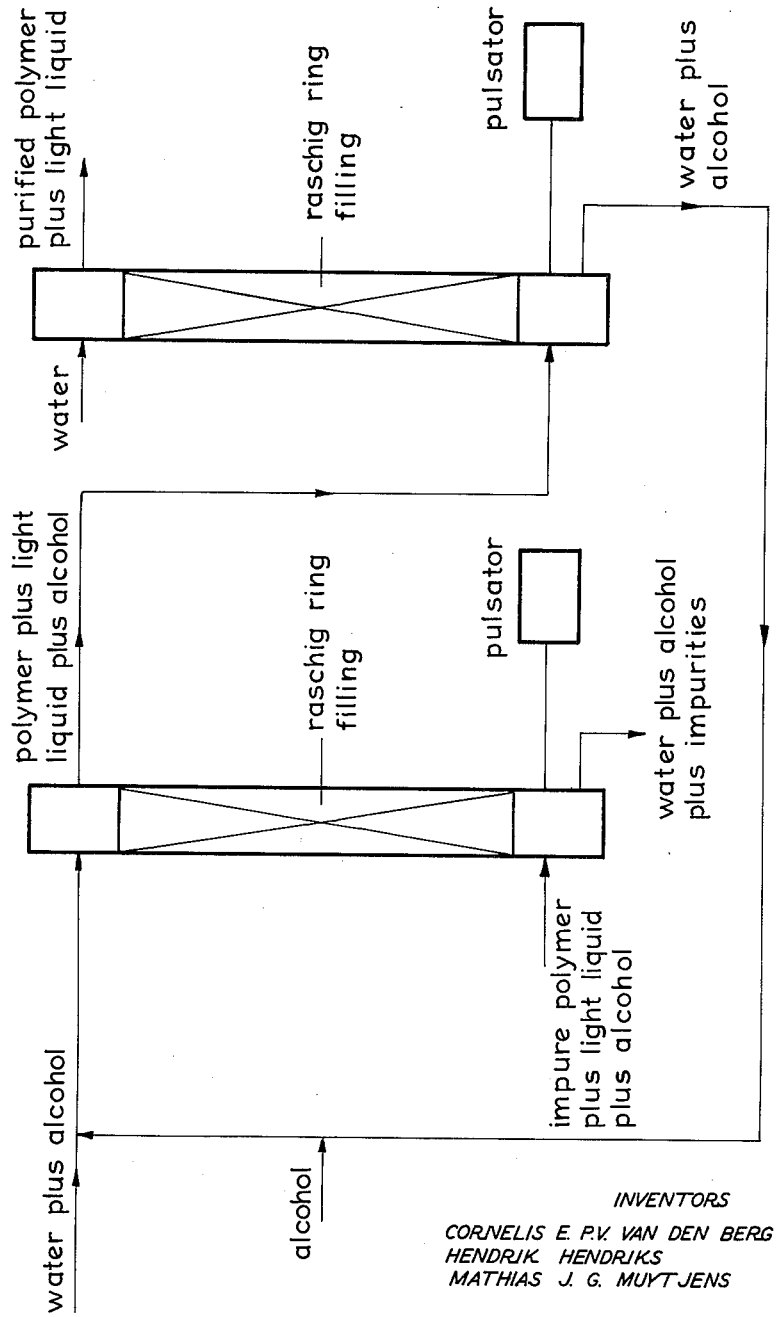

3,198,777
PROCESS FOR PURIFYING POLYMERS
Cornelis E. P. V. van den Berg, Hendrik Hendriks, and Mathias J. G. Muytjens, all of Geleen, Netherlands, assignors to Stamicarbon N.V., Heerlen, Netherlands
Filed June 7, 1960, Ser. No. 34,517
Claims priority, application Netherlands, June 10, 1959, 240,075
8 Claims. (Cl. 260—88.2)

This invention relates to a process for purifying polymers in which the impurities-containing polymer together with a first liquid is brought into contact with a second liquid which is incompletely miscible with, and heavier than, the first liquid and, thereupon, the polymer together with the first liquid is separated from the heavier liquid which now contains the impurities.

A related process is known from Belgian Patent No. 567,031. This patent deals with the removal of catalyst residues from hydrocarbon polymers formed by polymerization with, for example, Ziegler catalysts at low pressure. According to the disclosure in said Belgian patent, the product formed during the polymerization is primarily brought into contact with an alcohol, as a result of which the catalyst particles present in the product are de-activated. Subsequently, a liquid immiscible with the distributing agent used in the polymerization is added, for example, water. The resulting bottom layer which contains a portion of the catalyst residue, is then separated off.

When the procedure described in the Belgian patent is carried out on an industrial scale, there is encountered the drawback that the extraction of the product resulting from the polymerization has to be repeated many times in order to obtain a sufficiently pure polymer, necessitating an extensive installation and a relatively considerable degree of supervision. Moreover, the separation of the heavier liquid on an industrial scale is difficult to realize in many cases.

The present invention provides a process by which the above mentioned drawbacks can be overcome. In particular, the invention provides a process by which polymers, such as polyethylene, polypropylene or copolymers prepared with Ziegler catalysts can be purified on a large scale and to a high degree with a relatively small installation and with little supervision. Other advantages resulting from the process according to the present invention will be pointed out below.

The process for purifying polymers according to the present invention — wherein the impurities-containing polymers together with a first liquid is brought into contact with a second liquid which is incompletely miscible with and heavier than the first liquid, following which the polymer together with the first liquid is separated from the heavier liquid containing the impurities—is characterized in that the impurities-containing polymer together with the first liquid is continuously passed upwards through a column provided with obstructions and the heavier liquid is continuously passed downwards through the said column in such a way that the lighter liquid forms a continuous phase in the column, while the contents of the column are pulsated, preferably with a frequency of 50–400 pulsations per minute.

The above mentioned obstructions in the column, i.e., umn is obtained by controlling the discharge of the heavier liquid from the base (bottom) of the column in such a way, that the interface between the lighter and heavier liquids is in the bottom section of the column.

When the frequency of the pulsations is less than 50 per minute and all other conditions are left unchanged, a product of lesser purity is obtained. This also applies when the frequency of the pulsations is higher than 400 per minute.

The above mentioned obstructions in the column, i.e., the contact promoting means, can consist, for example, of inwardly extending bulges on the wall of the column, various types of column packings, or perforated plates. Preferably, use is made for this purpose of rings formed of polyolefins, such as polyethylene. Compared with porcelain rings, these rings have the advantage that they are not wetted, or are only sightly wetted, by the heavier liquid; they can be made so thin as to leave a free space amounting to 60–70% of the volume of the column.

The volume displaced by one pulsation, calculated on the basis of an empty column, should preferably be sufficiently large so that the linear displacement of the liquid in the column equals one-fifth of the diameter of the rings. When the displaced volume is smaller, the polymer will be less purified. Increasing the displaced volume to the extent that the linear displacement becomes greater than about twice the ring diameter, does not give a further increase in the purity of the polymer.

The distributing agent used in the polymerization, as gasoline or kerosine, is primarily suitable for use as the lighter liquid, while water is primarily used as the heavier liquid. It is preferred to add alcohol to a polymerization product obtained with the aid of Ziegler catalysts, which results in a de-activation of the catalyst particles contained therein. The entire mixture thus obtained is led into the base of the column, i.e., bottom—preferably after the catalyst particles and the alcohol have reacted with each other for some time, say a few hours, at an elevated temperature—while water is fed into the top of the column. The process is preferably carried out in such a way that the quantity of water passed through the column in one hour amounts to 5–25% by volume of the quantity of the lighter liquid passed through in one hour.

A slight amount of some acid, for example sulphuric acid or hydrochloric acid, or some base, for example sodium hydroxide, can be preliminarily added to the alcohol or the water, if this should be desirable for achieving proper de-activation or removal of catalyst residues from a given polymerization product. With some hard-to-wash products, it is advantageous to first treat the suspension with an acidulated alcohol, then to wash the mixture with water in the column and, thereupon, to subject it successively to treatment with an alcoholic lye and to washing with water in the column.

In the case of some hard-to-wash products, use can also be made of a wetting agent. It is advantageous to add this wetting agent to the water.

It is a remarkable fact that the process according to the invention can be carried out even when a liquid lighter than the polymer itself is used as the heavier liquid, whereas the polymer is not dissolved. For example, when an amount of water-containing methanol is added to a suspension of catalyst-containing Ziegler polyethylene (specific gravity 0.96) in gasoline, there is formed a lower layer having a specific gravity of less than 0.96. Accordingly, the polymer settles as far down as the bottom of the lower layer. However, if the above components are treated according to the invention, then, the polymer remains in the top layer in the form of a suspension or, at any rate, a suspension of polymer in gasoline leaves through the top of the column, while a polymer-free lower layer, being specifically lighter than the polymer, is obtained from the base of the column.

According to a preferred embodiment of the process of the instant invention, the product obtained from the polymerization and to which has been added a water-free or substantially water-free alcohol, such as methanol, ethanol, isopropyl alcohol or a butanol, is fed into the bottom (base) of a first pulsed column, while 4–30% by volume of water-containing methanol is introduced into the top of the column; thereupon, the methanol-containing product leaving through the top of the column is introduced into the base of a second pulsed column into which water is supplied through the top.

From the bottom of said second column, there is obtained a water-containing methanol layer which, upon addition of water-free methanol, can be fed back to the first pulsed column.

This procedure has the advantage that the polymer is thoroughly purified while, in the event the alcohol added consists exclusively of methanol, the resulting lighter liquid contains so little methanol and water that, following removal of the polymer, the methanol and water can be simply driven off by blowing, say, 10–20 litres of nitrogen per litre through it.

Following removal of the dissolved polymers contained in the distributing agent, the latter can be re-used in the polymerization operation without further purification.

The process according to the invention can also be executed in ways other than those described above. For example, the product obtained from the polymerization, which still contains active catalyst particles, can be directly introduced into the bottom of the column, while an alcohol containing a polar substance, say urea, is fed into the top of the column, the quantity of the polar substance used being such that a more-phase system will be formed. In this way, de-activation and simultaneous removal of the catalyst are effected under water-free and countercurrent conditions. It is also possible to use polar substances other than urea, such as sulphuric acid, sodium hydroxide, sodium acetate, acetic acid, ethylene glycol or glycerol.

If desired, a polymer slurry purified in the column can be passed through a thickener, for example through a cyclone. Methanol can be added to the thickened suspension before filtering, if so desired; this has the advantage that the filterability is improved, for example, in the case of polypropylene. There is obtained in this way a very compact installation in which the polymer can be thoroughly purified.

The following examples are given by way of further explanation of the invention, but are not intended to restrict it in any way whatsoever.

*Example 1*

The process is carried out in a cylindrical column 3.8 cm. in diameter and 300 cm. high, filled with polyethylene Raschig rings having an inner diameter of 7 mm., an outer diameter of 10 mm. and a height of 10 mm. The column communicates with a pulsator which imparts 220 pulsations per minute to the contents of the column, the volume displaced by each pulsation being 7.5 ml.

30% by volume of methanol is added to a suspension of polyethylene in gasoline obtained by the Ziegler process; the mixture is introduced into the column at the rate of about 11 litres per hour. Water is fed into the top of the column at the rate of 1.2 litres per hour. The temperature of the column contents is maintained at 45–47° C.

A polymer-free bottom layer, being specifically lighter than the polymer, is discharged from the base of the column at the rate of 4.5 litres per hour, as a result of which the interface between the light and the heavy liquid is in the base of the column. A suspension of the polymer in gasoline leaves through the top of the column and, after separation of the gasoline, possesses a high degree of purity. Moreover, a plate pressed from this product exhibits a high degree of whiteness.

If the non-ionogenic wetting agent sold under the trade name "Lissapol" be added to the suspension obtained from the polymerization, a product with approximately the same degree of whiteness is obtained. If this wetting agent be added to the water, then, there is obtained a product with an even slightly higher degree of whiteness.

*Example 2*

The process is carried out in a cylindrical column having a diameter of 3.8 cm. and a height of 300 cm., filled with the rings mentioned in Example 1. The column communicates with a pulsator which imparts 105 pulsations per minute to the column contents, the volume displaced per minute being 10.5 ml.

A suspension of polyethylene in gasoline obtained by the Ziegler process, to which is added 33% by volume of methanol, is introduced into the base of the column at the rate of about 10 litres per hour. Water is fed into the top of the column at the rate of 2.4 litres per hour. The temperature of the column contents is maintained at 43–45° C.

A polymer-free bottom layer, being specifically lighter than the polymer, is discharged from the base of the column at the rate of about 6 litres per hour, as a result of which the interface between the light and the heavy liquid lies in the bottom of the column. A slurry of the polymer in gasoline leaves through the top of the column and, after separation of the gasoline, possesses a high degree of purity and whiteness.

*Example 3*

The process is carried out in a cylindrical column having a diameter of 2.4 cm. and a height of 80 cm., provided with constrictions. The column communicates with a bellows pump which imparts about 200 pulsations per minute to the column contents, the volume displaced per pulsation being about 2 ml.

A suspension of polyethylene in gasoline, obtained by the polymerization of ethylene by the Ziegler process and to which has been added 10% by volume of methanol, is fed into the base (bottom) of the column at the rate of about 1 litre per hour. Water is introduced into the top of the column at the rate of 1 litre per hour. The temperature of the column contents is maintained at 40 to 50° C.

A polymer-free bottom layer is discharged from the bottom of the column at the rate of about 1.1 litre per hour, with the result that the interface between the light and the heavy liquid lies in the base (bottom) of the column. A suspension of polymer in gasoline leaves through the top of the column and, after separation of the gasoline, possesses a high degree of purity and whiteness. The gasoline contains no more than 0.0008% by weight of methanol.

*Example 4*

The process is carried out in a cylindrical column having a diameter of 20 cm. and a height of 200 cm., which is filled with polyethylene Raschig rings of 12 mm. inner diameter, 16 mm. outer diameter and 15 mm. in height. The column communicates with a pulsator which imparts 200 pulsations to the column contents, the displaced volume per pulsation being 400 ml.

A suspension of polyethylene in gasoline to which has been added 20% by volume of methanol, is introduced into the base of the column at the rate of 150 litres per hour. Water is fed into the top of the column at the rate of 10 litres per hour. The temperature of the column contents is kept at 40–50° C. A polymer free bottom layer, being specifically lighter than the polymer, is discharged from the bottom of the column at a rate of about 40 l. per hour, while the interface between the light and the heavy liquid lies in the bottom section of the column. A suspension of polymer in gasoline leaves through the top of the column and, after separation of the gasoline, possesses a high degree of purity and whiteness. The gasoline contains no more than 0.0007% by weight of methanol.

When the extraction of the polymer suspension is carried out on an industrial scale by a batch process, it is extremely difficult to discharge the formed polymer-free bottom layer. Moreover, even when the extraction has been repeated twenty (20) times, the bottom layer still shows an acid reaction, which indicates that chlorine compounds have been left behind in the polymer.

This is also reflected in the lower degree of whiteness of a plate pressed from a polymer that has not been purified according to the present invention. In contrast thereto, when the suspensions treated in the way described in the examples are extracted with water, the bottom layers are immediately obtained in acid-free form.

In the above examples the invention is applied to suspensions of Ziegler-polyethylene. The process according to the invention can also be applied to hard-to-wash suspensions, emulsions or solutions of polymers or copolymers of other monomers, particularly the α-olefins, such as propylene, 1-butene, isobutene, styrene, butadiene, isoprene or for example chloroprene.

The invention described above is still further illustrated in the attached diagrammatic drawing, wherein FIGURE 1 and FIGURE 2 represent flowsheets of the embodiments of the invention using one and two columns, respectively.

We claim:

1. Process for purifying a polymer contaminated with impurities, comprising the following steps: continuously passing upward in a contacting zone, comprising an elongated column containing flow obstructing means and having a polymer exit, the contaminated polymer together with a first liquid countercurrent to a continuously downwardly moving second liquid, said second liquid being heavier than and incompletely miscible with said first liquid; simultaneously pulsating the contents of the contacting zone, to maintain the polymer suspended in the lighter liquid and to insure passage of the polymer in the direction of said polymer exit whereby the impurities are transferred to the downwardly moving heavier liquid; continuously discharging from the bottom of the column a stream of the heavier liquid charged with impurities; continuously controlling said discharge so that the interface between the lighter and the heavier liquids lies in the bottom section of the column, whereby the lighter liquid forms a continuous phase in the column; continuously removing the polymer substantially free of impurities from the top of the column, together with the first liquid and thereafter separating the purified polymer from the first liquid.

2. Process according to claim 1, wherein the frequency of pulsations ranges from 50 to 400 pulsations per minute.

3. Process according to claim 1, wherein a distributing agent has been used in the preparation of the polymer, and said agent is used as the lighter liquid, while water is used as the heavier liquid.

4. Process according to claim 3, wherein an alcohol is added to the product obtained from the polymerization, and the resultant mixture is supplied to the column.

5. Process according to claim 3, wherein the quantity of water passed per hour through the column amounts to 5-25% by volume of the quantity of lighter liquid passed through the column per hour.

6. Process according to claim 1, wherein the liquid leaving the bottom section of the column has a specific gravity lower than that of the polymer.

7. Process according to claim 1, wherein the product removed from the top of the column is passed upward in a second column countercurrent to a descending stream of a heavier liquid, the contents of the second column being likewise pulsated, whereby the polymer is subjected to further purification.

8. Process according to claim 3, wherein substantially water-free methanol is added to the product obtained from the polymerization, the resultant mixture is supplied into the bottom section of the column, while methanol containing 4-30% by volumn water is passed into the top section of the column, a methanol-containing product is removed from the column and is contacted in a second column in countercurrent fashion with water introduced at the top thereof, the contents of the second column being likewise subjected to pulsations.

References Cited by the Examiner

UNITED STATES PATENTS 2,742,381    4/56    Weiss et al. _____ 23—310

FOREIGN PATENTS 961,576    4/57    Germany.
567,031    5/58    Belgium.

JOSEPH L. SCHOFER, *Primary Examiner.*

LESLIE H. GASTON, MORRIS LIEBMAN, *Examiners.*

UNITED STATES PATENT OFFICE

CERTIFICATE OF CORRECTION

Patent No. 3,198,777 August 3, 1965

Cornelis E. P. V. van den Berg et al.

It is hereby certified that error appears in the above numbered patent requiring correction and that the said Letters Patent should read as corrected below.

Column 1, line 64, for "The above mentioned obstructions in the column, i.e.," read -- The continuous phase of the lighter liquid in the col- --.

Signed and sealed this 15th day of February 1966.

(SEAL)
Attest:

ERNEST W. SWIDER
Attesting Officer

EDWARD J. BRENNER
Commissioner of Patents